United States Patent [19]

Simpson

[11] Patent Number: 4,935,217

[45] Date of Patent: Jun. 19, 1990

[54] MORDENITE AND MORDENITE AGGREGATE SYNTHESES

[75] Inventor: Dale R. Simpson, Bethlehem, Pa.

[73] Assignee: Lehigh University, Bethlehem, Pa.

[21] Appl. No.: 271,418

[22] Filed: Nov. 10, 1988

Related U.S. Application Data

[63] Continuation-in-part of Ser. No. 27,792, Mar. 19, 1987, abandoned.

[51] Int. Cl.$^5$ .............................................. C01B 33/28
[52] U.S. Cl. .................................................... 423/328
[58] Field of Search ............... 423/328, 329, 334, 118, 423/127; 502/78

[56] References Cited

U.S. PATENT DOCUMENTS

| | | | |
|---|---|---|---|
| 3,445,184 | 5/1969 | Whittemore, Jr. | 423/118 |
| 3,574,539 | 4/1971 | Domine et al. | 423/328 |
| 3,714,366 | 1/1973 | Fukuda et al. | 423/328 |

FOREIGN PATENT DOCUMENTS

| | | | |
|---|---|---|---|
| 0109729 | 5/1984 | European Pat. Off. | 423/328 |
| 2017745 | 5/1970 | France | 423/328 |
| 0082327 | 6/1971 | German Democratic Rep. | 423/328 |
| 0083978 | 8/1971 | German Democratic Rep. | 423/328 |
| 0013287 | 10/1975 | Japan | 423/328 |
| 0880978 | 11/1981 | U.S.S.R. | 502/78 |

OTHER PUBLICATIONS

Breck, "Zeolite Molecular Sieves", Wiley and Sons Inc., 1974 pp. 245–250, 262, 264–267, 374–378, 725–727, 738–740, 754–755.

Aiello et al., "Zeolite Formation from Synthetic and Natural Glasses" Molecular Sieve Zeolites-I, Adv. in Chem. Series, pp. 51–62 (1971).

Primary Examiner—John Doll
Assistant Examiner—R. Bruce Breneman
Attorney, Agent, or Firm—Ratner & Prestia

[57] ABSTRACT

Mordenite, a synthetic zeolite, is produced by reaction of particulate volcanic glasses with limited amounts of strongly basic aqueous solutions at elevated temperature and autogenic pressure for approximately one day.

9 Claims, No Drawings

MORDENITE AND MORDENITE AGGREGATE SYNTHESES

This application is a continuation-in-part of U.S. Ser. No. 027,792, filed Mar. 19, 1987, now abandoned.

Zeolites comprise a family of natural and synthetic silicate minerals which find extensive industrial and commercial use as "molecular sieves", catalyst carriers, and ion exchange media. The framework of the molecular structures of different zeolites are arranged so that the zeolites contain cavities or voids having defined sizes. These cavities or voids have ports on the surface of the zeolite mineral which permit selective entry or exit by various materials based upon their relative sizes. It is therefore commonly known that a particular zeolite species may be selected which will adsorb certain molecules and reject others.

Mordenite is a high silica zeolite which has an ideal composition of $Na_2O.Al_2O_3.10SiO_2.6H_2O$. As with the other members of the zeolite family, compositional variance around this ideal formula is common.

Because of its high ratio of silica to alumina, mordenite has various desirable characteristics including stability in acid solution and structural stability with dehydration. Mordenites void dimensions are approximately 2.9 Å by 5.7 Å and 6.7 Å by 7.0 Å. Mordenite has an approximate void volume of 28%.

Mordenite is currently available from the Linde Division of Union Carbide and from the Norton Company. Mordenite is an expensive zeolite costing approximately $5.60 per pound in 1,500 pound lots.

Typically, mordenite is synthesized by reacting an alumino silicate gel in a stirred autoclave at approximately 175° C. and 200 psi for about one day. The product of such reaction is then separated from the liquid supernatant which remains and dried to yield the mordenite product.

U.S. Pat. No. 3,436,174 (Sand) discloses a process for the production of mordenite using siliceous volcanic glass in sodium silicate solutions under saturated vapor pressure. Typically, a starting material such as a volcanic glass, clay, mica, or amorphous silica is reacted in approximtely two times its weight, or about four times its volume, of a concentrated sodium silicate solution at elevated temperature and pressure (typically 120°–260° C., 200 psi). Many other methods similar to the Sand patent may be found in the prior art, and all share their characteristic uses of large quantities of sodium silicate solution or gel for reaction with the various starting solid or solution feedstocks. All similarly share the disadvantages of using large volumes of liquid which must be separated from the product mordenite, with the concomitant requirement that the product be dried, and many use additional materials in the reaction mix, such as sodium aluminate.

U.S. Pat. No. 3,445,184 to Whittemore discloses the formation of shaped bodies of mordenite. According to the disclosure, preformed pellets of fired silica-clay-sodium silicate are autoclaved at temperatures below 290° C. in aqueous sodium silicate solutions. Specific raw materials include kaolinite, diatomaceous earth and aqueous sodium silicate. Pellets made from the kaolinite and diatomaceous earth are fired at temperatures of about 600° C. to destory the crystallinity of the kaolinite. In addition, no method to control porosity or permeability of the finished product body is disclosed.

BRIEF DESCRIPTION OF THE INVENTION

According to the present invention, mordenite is synthesized by the reaction of volcanic glass with sodium hydroxide or sodium carbonate at 96° to 200° C. under autogenous pressure. The volcanic glass may be obsidian, perlite, pumicite or others of similar composition of approximately:

| | |
|---|---|
| $SiO_2$ | 72% |
| $Al_2O_3$ | 14% |
| Alkali | 8% |
| Water and Minor Elements | Balance |

The ratio of glass to aqueous base solution is critical for obtaining high quality mordenite. This ratio should be in the range of 2:1 to 10:1. The resulting product zeolite is mordenite with a minimum of excess water, most of which escapes the reaction vessel as steam at the conclusion of the reaction. In addition, the synthetic methods of the present invention may produce a preformed pellet or other shape or mordenite having a predetermined porosity and permeability and having no inert binder phase to dilute the mordenite.

DETAILED DESCRIPTION OF THE INVENTION

Volcanic glasses such as obsidian (a massive volcanic glass of granite composition), perlite (similar to obsidian but with sorbed water within the glass), pumicite (glass fragments which quenched in the atmosphere following a volcanic eruption), or others of similar composition may be found in plentiful deposits in the Western United States. Pumicite is mined as a particulate, while obsidian and perlite must be ground to appropriate mesh sizes prior to use. Typically, these materials are ground and screened to a preselected mesh (for example, −140 mesh) selected to provide optimal structural characteristics and reactions kinetics.

The volcanic glass is combined with a very small amount of an aqueous base and reacted in a sealed vessel at temperatures of from 96°–200° C. for periods of approximately one day to two weeks. Upon opening the reaction vessel, excess water typically escapes as steam and the remaining moist material removed from the vessel as product. The following examples serve to illustrate the basic reaction techniques.

Example 1

2 grams pumicite were mixed with one gram 12% solution of sodium hydroxide (12 grams NaOH and 88 grams $H_2O$) and reacted in a sealed vessel at 200° C. for twenty-one hours. The reaction was found to have gone to completion and the product was analyzed as mordenite.

Example 2

2 grams obsidian ground to −140 mesh (0.105 mm) were mixed with one gram of a 12% solution of sodium hydroxide and reacted in a sealed vessel at 200° C. for 21 hours. The reaction was found to have gone to completion and the product was mordenite.

EXAMPLE 3

2 grams of perlite ground to −140 mesh were mixed and reacted as in Example 2. The reaction was found to have gone to completion and the product was analyzed as being mordenite.

The synthesis of mordenite aggregates typically involves the synthesis of mordenite followed by the addition of a non-mordenite binder phase for aggregate formation. The use of the non-mordenite binder has the undesirable result of diluting the mordenite and of introducing additional handling steps in the production of the mordenite aggregates. According to the present invention, aggregates of mordenite may be produced directly without the introduction of non-mordenite binders.

Mordenite aggregates may be synthesized in a desired form by packing a moist mixture of finely divided volcanic glass and a strongly basic aqueous solution in a mold and reacting the packed mixture under autogenous pressure at elevated temperature. The following examples will serve to illustrate the production of mordenite aggregates.

Example 4

10 grams of perlite were mixed with 2 grams of 12% sodium hydroxide solution, packed in a teflon sleeve and reacted in a closed vessel at 200° C.±5° C. for 23 hours. The product was found to be a coherent mordenite plug.

Example 5

10 grams of perlite were mixed with 0.2 grams anhydrous sodium carbonate and two grams of water. Reacted at 200° C.±5° C. under autogenous pressure, the product was found to be a friable mordenite plug. It should be noted that higher quantities of sodium carbonate in the mixture yielded product with improved coherence.

Example 6

10 grams of perlite were reacted with 0.5 grams of "washing powder" (Arm and Hammer) and 2 grams of water. The reaction conditions were as in Example 5. The product was found to be a coherent mordenite plug.

Example 7

10 grams of perlite were mixed with 1 gram of 25% sodium hydroxide solution, packed in a teflon sleeve and reacted in a closed vessel at 200° C. for 20 hours. The product was found to be a coherent mordenite plug.

In other experiments, pumicite was used with success instead of perlite.

The use of sodium carbonate as the strongly basic salt has been found to be advantageous in practicing the process of the present invention. Excess sodium carbonate may be washed from the reaction product at the conclusion of the reaction. It appears that the presence of carbonate ions in the reaction mixture serves to reduce the alkaline content of the mordenite by forming an alkaline carbonate phase (for example, calcite). In particular, sodium carbonate with 10 waters of crystallization is a preferred source of carbonate ions. A sodium carbonate and sodium silicate mixture is marketed as "washing powder" by Arm and Hammer Company and has been used with success.

The volcanic glass and base mixture is typically packed in a sleeve. Sleeves may be formed of various materials including teflon, other plastics, glass and iron so that the formed plug need not be removed from the sleeve for its eventual use.

Experiments were conducted to determine whether the porosity and permeability of the mordenite aggregates could be controlled. It has been found that by controlling the particle size of the volcanic glass used in the reaction, the porosity and permeability of the mordenite aggregate may be controlled with a high degree of regularity. It is also evident that the degree to which the reaction mixture is packed in the sleeve or mold determines porosity or permeability.

It has been found that the strongly basic reactant solution required by the present invention must be within certain limits. According to early experimental results, a 1.2% solution of sodium hydroxide yields a poor quality and incomplete reaction, while 1 part of a 25% solution of sodium hydroxide to 2 parts of glass yields a poorly crystalized product which appears to be phillipsite. In particular, the concentration and quantity of the basic solution appears to be most important. The base must be sufficiently strong to promote a reaction with the volcanic glass, but not so strong as to yield a different and undesired phase product.

A complicating factor in the reaction of the present invention is the consumption of water. Mordenite contains over 12% water of crystalization. Even if base concentrations at the beginning of the reaction are within appropriate limits, it is evident that water consumption may easily cause concentration of the base with undesirable products and results. It must be noted that sodium carbonate may be used in excess because of its limited solubility in the reaction solution. As water is consumed during the reaction, there is a "salting out" of excess sodium carbonate.

Although the specific kinetics are not known, it appears that there is a limiting sodium concentration for the reaction system. While one may approximately calculate an ideal concentration of base in the reaction system, the self limiting nature of the sodium carbonate system makes such exacting studies unnecessary.

In general, however, it appears that solutions of below 25% sodium hydroxide concentration must be employed if the ratio of glass to solution is less than 10 parts of glass to 1 part of solution. Furthermore, the use of sodium carbonate provides a simple expedient for the removal of unwanted contaminants to the mordenite product which may be present in the volcanic glass starting material. Such contaminants included iron oxides, and other metal oxides. The use of sodium carbonate followed by an acid wash of the mordenite product provides a simple way to remove some such contaminants.

Finally, the inventors of the present invention has succeeded in extruding preforms which may be reacted to form mordenite directly. The following examples serve to illustrate this extrusion process.

Example 8

70 grams of −45 micrometer perlite powder mixed with 21 cc of 12% sodium hydroxide solution were packed in a teflon band. The reaction mixture was maintained at 200° C. under autogenic pressure for twenty-four hours. The product was found to be a coherent and permeable mordenite aggregate.

Example 9

50 grams of −125+88 micrometer perlite powder were mixed with 15 cc of 12% NaOH solution and reacted as above. The product formed a coherent mordenite aggregate with greater permeability than that of the prior example.

Example 10

40 grams of −45 micrometer perlite powder were mixed with two grams of Arm and Hammer washing powder and 6 cc of water. This mixture was reacted as above. The product mordenite was contaminated with minor quantities of carbonate bearing solids (sodium carbonate, calcium carbonate, etc.) The product was found to be a coherent aggregate from which the excess alkali carbonates could be washed in dilute acid. Similarly, pumice and obsidian have been used with success.

Comparative Example 11

Perlite glass was sized to −180+170 μM and then mixed with a 12% sodium hydroxide solution. This mix was reacted in a closed vessel at 200° C. under autogenous pressure for 24 hours. Mix A had a solid-to-solution ratio of 3.33:1; Mix B had a solid-to-solution ratio of 1:1. Mix A before reaction was a moist granular material; Mix B was a sediment overlain by a supernate. After reaction, the products of the experiments were x-rayed on an APD 1700 Automated Powder Diffractometer using $CuK_{60}$ radiation.

Mix A had an x-ray diffraction pattern characteristic of mordenite.

Mix B gave a mixed diffraction pattern indicative of 30% mordenite plug 70% analcite. The sample contains analcite as a major phase. Analcite is $NaAlSi_2O_6.2H_2O$, and for comparison mordenite is ideally $Na_2Al_2Si_{10}O_{24}.7H_2O$. The aluminum to silicon ratio of analcite is 1:2 and in mordenite it is 1:5. These experiments clearly show that if excess solution is used, silica is leached from the solid and contained in the excess solution as a soluble sodium silicate. The leached solid then crystallizes to mordenite and a silica deficient phase, analcite. Analcite lacks desirable zeolitic properties.

I claim as my invention:

1. A method for the production of mordenite and mordenite aggregates from volcanic glass according to the following steps:
    (a) preparing a mixture of particulate volcanic glass and an aqueous strong base solution in a ratio of from about 2:1 to about 10:1 parts glass per part aqueous base solution;
    (b) maintaining said mixture at a temperature of from 96° C. to 200° C. and autogenic pressure in a sealed vessel for from about 12 hours to about two weeks;
    (c) recovering mordenite as a product.

2. The process of claim 1 wherein said volcanic glass is selected from the group consisting of granitic glasses such as obsidian, pumicite, pumice, pitchstone, and perlite.

3. The process of claim 1 wherein said aqueous base is selected from the group consisting of sodium hydroxide, sodium carbonate, and sodium silicate.

4. The process of claim 3 wherein the concentration of said base is from 1 to 20% measured as $Na_2O$.

5. The process of claim 1 wherein said mixture is packed in a preform prior to step (b) in order to produce a mordenite aggregate.

6. The process of claim 1 wherein said mixture is extruded to form a preform prior to step (b) in order to produce a mordenite aggregate.

7. The process of claim 6 wherein the particle size of said volcanic glass is selected to control porosity and permeability of said mordenite aggregate product.

8. The process of claim 7 wherein the packing pressure applied to said preform is selected to control porosity and permeability of said mordenite aggregate product.

9. A method for the production of mordenite and mordenite aggregates from volcanic glass according to the following steps:
    (a) preparing a mixture of particulate volcanic glass and an aqueous strong base solution in a ratio of from about 2:1 to about 5:1 parts glass per part aqueous base solution;
    (b) maintaining said mixture at a temperature of from 96° C. to 200° C. and autogenic pressure in a sealed vessel for from about 12 hours to about two weeks;
    (c) recovering mordenite as a product.

* * * * *